United States Patent
Dadheech et al.

(10) Patent No.: US 9,806,326 B2
(45) Date of Patent: Oct. 31, 2017

(54) ONE-STEP METHOD FOR PREPARING A LITHIATED SILICON ELECTRODE

(71) Applicant: GM GLOBAL TECHNOLOGY OPERATIONS LLC, Detriot, MI (US)

(72) Inventors: Gayatri Vyas Dadheech, Bloomfield Hills, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 342 days.

(21) Appl. No.: 14/560,278

(22) Filed: Dec. 4, 2014

(65) Prior Publication Data

US 2015/0162596 A1 Jun. 11, 2015

Related U.S. Application Data

(60) Provisional application No. 61/912,462, filed on Dec. 5, 2013.

(51) Int. Cl.
| | |
|---|---|
| *H01M 4/13* | (2010.01) |
| *H01M 4/04* | (2006.01) |
| *H01M 4/136* | (2010.01) |
| *H01M 4/1397* | (2010.01) |
| *H01M 4/134* | (2010.01) |
| *H01M 4/1395* | (2010.01) |
| *H01M 10/052* | (2010.01) |
| *H01M 10/0566* | (2010.01) |
| *H01M 4/02* | (2006.01) |

(52) U.S. Cl.
CPC ......... *H01M 4/0419* (2013.01); *H01M 4/134* (2013.01); *H01M 4/136* (2013.01); *H01M 4/1395* (2013.01); *H01M 4/1397* (2013.01); *H01M 10/052* (2013.01); *H01M 10/0566* (2013.01); *H01M 2004/021* (2013.01); *H01M 2004/027* (2013.01); *H01M 2300/0088* (2013.01)

(58) Field of Classification Search
CPC .. H01M 4/0419; H01M 4/136; H01M 4/1397; H01M 4/134; H01M 10/052; H01M 4/1395; H01M 2300/0088; H01M 10/0566; H01M 2004/021; H01M 2004/027
USPC ...................................... 429/231.95
See application file for complete search history.

(56) References Cited

U.S. PATENT DOCUMENTS

| | | |
|---|---|---|
| 6,630,257 B2 | 10/2003 | Ye et al. |
| 8,399,065 B2 | 3/2013 | Shang et al. |
| 8,663,840 B2 | 3/2014 | Nazri et al. |
| 8,974,946 B2 | 3/2015 | Cai et al. |
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |

(Continued)

*Primary Examiner* — Gary Harris
(74) *Attorney, Agent, or Firm* — Harness, Dickey & Pierce, P.L.C.

(57) ABSTRACT

In a one-step method for preparing a lithiated silicon electrode, a suspension of a lithium precursor and a silicon precursor in a carrier liquid is plasma sprayed without a carrier gas. The carrier liquid is water, alcohol, ethylene glycol, or mixtures thereof. The lithium precursor is selected from the group consisting of a lithium phosphate, a lithium nitrate, a lithium sulfate, a lithium carbonate, and combinations thereof. The suspension excludes an active carbon material and a binder.

20 Claims, 2 Drawing Sheets

(56) References Cited

U.S. PATENT DOCUMENTS

| | | |
|---|---|---|
| 9,142,830 B2 | 9/2015 | Xiao et al. |
| 9,153,819 B2 | 10/2015 | Huang et al. |
| 9,160,036 B2 | 10/2015 | Yang et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,455,430 B2 | 9/2016 | Huang et al. |
| 9,537,144 B2 | 1/2017 | Huang et al. |
| 2009/0246633 A1 | 10/2009 | Shiozaki et al. |
| 2009/0305106 A1* | 12/2009 | Gell ............. B82Y 30/00 429/488 |
| 2010/0323118 A1 | 12/2010 | Mohanty et al. |
| 2012/0229096 A1 | 9/2012 | Nazri |
| 2012/0231321 A1 | 9/2012 | Huang et al. |
| 2012/0251885 A1 | 10/2012 | Ellsworth et al. |
| 2013/0284338 A1 | 10/2013 | Xiao et al. |
| 2014/0272526 A1 | 9/2014 | Huang |
| 2014/0272558 A1 | 9/2014 | Xiao et al. |
| 2015/0014890 A1 | 1/2015 | Xiao |
| 2016/0111721 A1 | 4/2016 | Xiao et al. |

\* cited by examiner

ONE-STEP METHOD FOR PREPARING A LITHIATED SILICON ELECTRODE

CROSS-REFERENCE TO RELATED APPLICATIONS

This application claims the benefit of U.S. Provisional Patent Application Ser. No. 61/912,462, filed Dec. 5, 2013, which is incorporated by reference herein in its entirety.

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a one-step method for preparing a lithiated silicon electrode, a suspension of a lithium precursor and a silicon precursor in a carrier liquid is plasma sprayed without a carrier gas. The carrier liquid is water, alcohol, ethylene glycol, or mixtures thereof. The lithium precursor is selected from the group consisting of a lithium phosphate, a lithium nitrate, a lithium sulfate, a lithium carbonate, and combinations thereof. The suspension excludes an active carbon material and a binder. A pre-lithiated silicon electrode is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
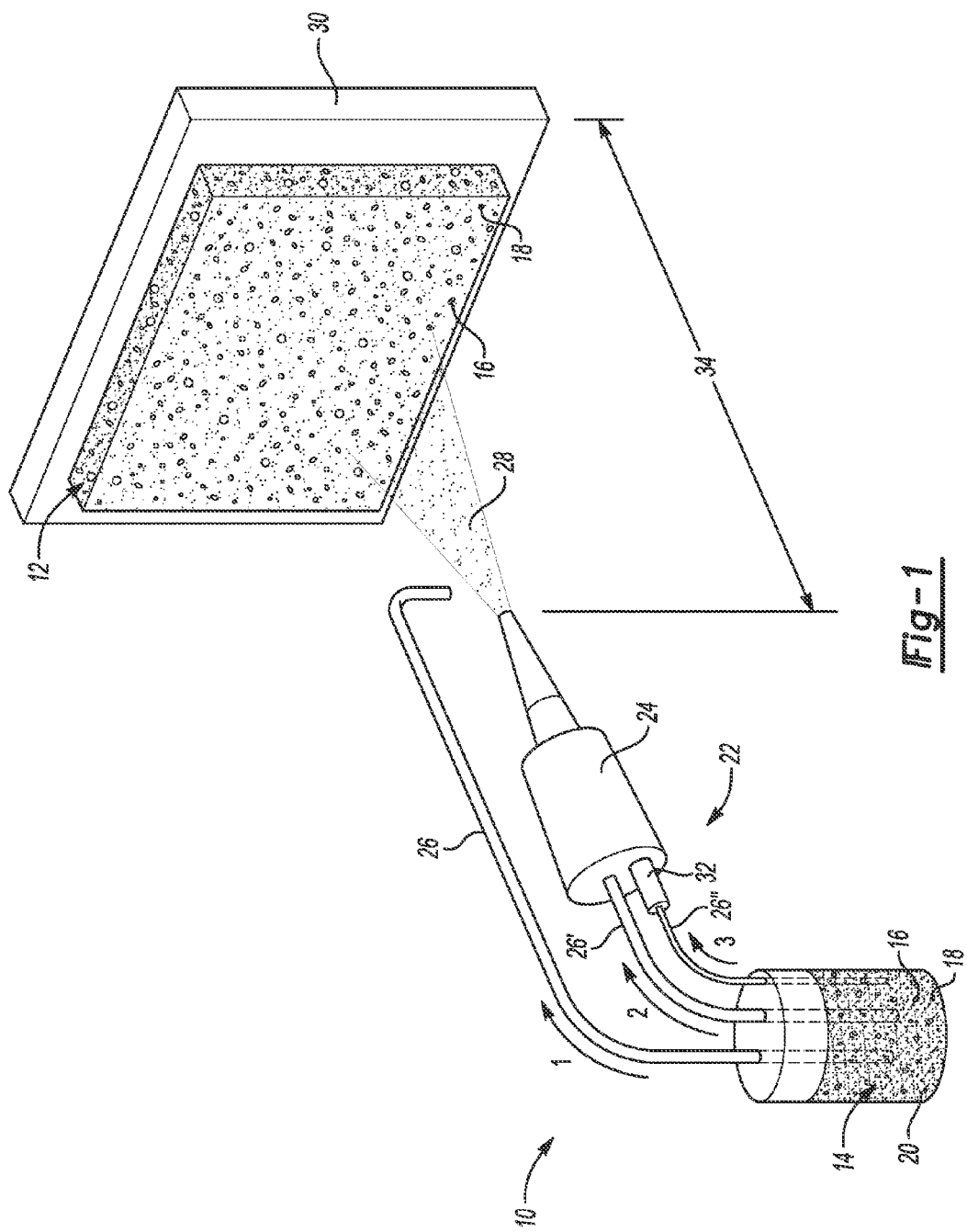
FIG. 1 is a schematic, perspective view of an example of a system for performing an example of a one-step method for preparing a lithiated silicon electrode.

The high theoretical capacity (e.g., 4200 mAh/g) of silicon renders it desirable for use as a negative electrode (e.g., anode) material in lithium-sulfur batteries. However, it has been found that negative electrode materials with high specific capacities also have large volume expansion and contraction during charging/discharging of the lithium ion battery. The large volume change (e.g., about 400%) experienced by the negative electrode material during charging/discharging causes silicon particles to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change. Many silicon electrodes include arrays of silicon wires or rods, or porous silicon films in order to accommodate the volume expansion during charging/discharging.

The volume expansion of silicon limits the manufacturing processes that may be used to form silicon-based electrodes having good performance. For example, a calendering process (which is used in many traditional electrode manufacturing processes) is generally not suitable because the silicon electrode tends to crack during this process. In addition, the volume expansion of silicon limits the characteristics of the electrode, such as silicon loading and thickness, when traditional processes are utilized. For example, a silicon loading over 4 mg/cm$^2$ and a thickness over 250 µm may result in cracking of the silicon electrode when exposed to conditions (e.g., residual stress during drying) associated with traditional electrode forming processes.

In addition to the limitations noted above, traditional silicon electrode processing techniques also require an additional lithiation step. This additional lithiation step is eliminated in the method disclosed herein.

The one-step method disclosed herein involves plasma spraying a suspension of nano- or micro-sized (i.e., diameter or average diameter ranging from about 0.1 nm to about 200 µm) lithium and silicon precursor particles. In some examples, the particle size of the suspension components ranges from about 1 nm to about 10,000 nm. In another example, the nanoparticle size may range from about 40 nm to about 70 nm. The solvent used in the suspension provides a cooling effect, so that unlike traditional powder spray processes, particles with trajectories along the edge or outside the plasma jet or flame substantially retain their spherical or unmelted shape. During this process, particles with trajectories along the hot zones of the plasma jet or flame form splats (i.e., small particles that aggregate together and form concentrated flat shapes) on the surface. This combination of spherical particles and splats results in a relatively dense lithiated silicon electrode that also exhibits a porosity ranging from about 15% to about 60% (without the use of a calendering process), which is suitable to accommodate volume expansion during discharge/charge cycles. In another example, the lithiated silicon electrode exhibits a porosity ranging from about 30% to about 50%. As such, using the method(s) disclosed herein, it is believed that nano-sized particles of silicon may be used to achieve a lithiated silicon electrode that has at least 4 mg/cm$^2$ silicon loading which achieves a desirable cell level energy density (e.g., >300 Wh/kg). This is unlike other methods in which the surface:volume ratio renders it difficult to achieve a desirable silicon loading with nano-sized particles.

As mentioned above, the method disclosed herein utilizes plasma spraying of a suspension to form a lithiated silicon electrode without additional processing steps, such as lithiation and calendering. FIG. 1 schematically illustrates an example of a system 10 for forming the lithiated silicon electrode 12.

The suspension 14 used in the examples disclosed herein includes a silicon precursor 16, a lithium precursor 18, and a carrier liquid 20. In some examples, the suspension 14 includes no other components. In other examples, the suspension 14 includes metal-organic precursors dispersed in isopropanol, or polymeric complexes. In still other examples, the suspension 14 includes a dispersant that aids in dispersing the silicon precursor 16 and the lithium precursor 18 throughout the selected carrier liquid 20. In each example of the suspension 14, it is to be understood that the suspension 14 does not include an active carbon material or a binder. As such, the resulting electrode 12 that is formed is also free of active carbon material and binder.

The final suspension 14 has a solid content up to 30% in some examples and up to 40% in other examples, a dispersant amount up to 5%, and a balance of the carrier liquid 20.

The silicon precursor 16 is a silicon nanopowder. The nanopowder particles have an average diameter ranging from about 1 nm to about 100 nm. The amount of silicon precursor 16 used in the suspension 14 is enough to form the electrode 12 having a silicon loading of at least 4 mg/cm$^2$. In an example, the silicon loading in the final electrode 12 ranges from greater than 4 mg/cm$^2$ to about 8 mg/cm$^2$. Examples of the silicon precursors 16 include 2,4,6,8,10-pentamethylcyclopentasiloxane $(CH_3SiHO)_5$, pentamethyldisilane $(CH_3)_3SiSi(CH_3)_2H$, silicon tetrabromide $(SiBr_4)$, silicon tetrachloride $(SiCl_4)$, tetraethylsilane $Si(C_2H_5)_4$, and 2,4,6,8-tetramethylcyclotetrasiloxane $(HSiCH_3O)_4$.

In an example, the lithium precursor 18 is a lithium nanopowder. Similar to the silicon nanopowder, the lithium particles also have an average diameter ranging from about 1 nm to about 100 nm. The lithium precursor 18 may be a lithium phosphate, a lithium nitrate, a lithium sulfate, a lithium carbonate, or combinations thereof. The lithium precursor 18 may also be in the form of polymer coated lithium nano-particles. Still further, lithium amides, such as Li bis(ethyldimethylsilyl)amides, may be used. These amides are prepared by deprotonation of parent amines using butyl lithium. In still other examples, a class of liquid lithium precursors may be used, which includes amides with $SiM_2R^2$ and $(SiM_2R^2)_2$, where M is Li, $R^2$=ethyl, n-propyl, i-propyl, n-butyl, n-hexyl, n-octyl in t-buyl or t-anyl.

In an example, the final suspension 14 is a 100 mL solution with the silicon precursor 16 (e.g., 2,4,6,8,10-pentamethylcyclopentasiloxane $(CH_3SiHO)_5$) and the lithium precursor 18 (e.g., lithium phosphate) present in a ratio of 50:50.

The liquid carrier 20 may be water, an alcohol (e.g., ethanol, n-propanol, i-propanol, n-butanol), ethylene glycol, or any mixtures of these components may be used (e.g., a mixture of water and alcohol, a mixture of water and ethylene glycol, etc.).

As noted above, in some examples the suspension 14 also includes a metal-organic precursor dispersed in isopropanol. Examples of the metal-organic precursor include aluminum heptanedionate as a precursor for alumina, triethylsilane as a precursor for silica, or titanium tetrakisdiethylamide as a precursor for titania. The metal-organic precursor may be present in an amount ranging from 1 wt % to about 50 wt % of the total wt % of the suspension 14.

In other examples of the suspension 14, a polymeric complex is added to the silicon precursor 16, the lithium precursor 18, and the carrier liquid 20. Organic acids may be used as the polymeric complex, examples of which include citrate, acetate, tartarate, formates, oxalate, and/or lactate. The polymeric complex may be selected to enhance the flow of the suspension 14 and/or to enhance the thermal properties of the electrode 12 that is formed. The polymeric complex may be present in an amount ranging from 1 wt % to about 10 wt% of the total wt % of the suspension 14.

Depending on the precursors 16, 18 (e.g., type, size, etc.) and the carrier liquid 20 that are selected, the suspension 14 may also include a dispersant to aid dispersing the precursors 16, 18 and to keep them from settling in the carrier liquid 20. The dispersant may be included in an amount ranging from about 0.1 wt % to about 5 wt % of the total wt % of the suspension 14. Examples of suitable dispersants include oligomeric dispersants and ethyl alcohol.

The system 10 shown in FIG. 1 also includes a plasma spray system 22. The plasma spray system 22 includes a plasma source 24 and a suspension feeding system 26, 26', 26".

The plasma source 24 includes a plasma torch, which generates a plasma jet 28. The plasma torch may create the plasma jet 28 using gas (e.g., air) and direct current (DC), alternating current (AC), or radio frequency (RF), and the plasma jet 28 may be gas-stabilized and/or water-stabilized. The spraying environment may involve air plasma spraying (APS), high velocity oxygen fuel spraying (HVOF), or vacuum spraying plasma (VPS).

The plasma source 24 is operated at relatively high current (e.g., 600 to 800 Amps) and low voltage (e.g., 60 to 80 Volts). The plasma spraying is also a high energy process (i.e., particle velocity higher than 2 Mach). In an example the temperature of the plasma spraying is less than 150° C. In another example, the temperature of plasma spraying ranges from about 37° C. to about 93° C. Still further, in another example the temperature of the plasma spraying ranges from about 60° C. to about 70° C. It is believed that the combination of high energy and temperature leads to minimal incorporation of contaminants into the electrode 12. Furthermore, these temperatures are low enough to avoid degradation of the substrate 30.

It is to be understood that the spray parameters (e.g., current, plasma power, particle flight, temperature, feed rate, etc.) and suspension 14 parameters (e.g., particle size, constituent phases, grain size, flowability, etc.) may be adjusted in order to avoid any overheating and/or to control features (e.g., thickness, morphology, porosity, density, etc.) of the electrode 12.

The suspension feeding system 26, 26', 26" may be integrated into the plasma source 24 or may be a stand-alone unit. Different examples of the suspension feeding system 26, 26', 26" are shown in FIG. 1. In an example (labeled "1" in FIG. 1), the suspension feeding system 26 delivers the suspension 14 as a fine liquid-based stream directly into the plasma jet 28. In another example (labeled "2" in FIG. 1), the suspension feeding system 26' injects the suspension 14 directly into a combustion chamber of the plasma torch. In still another example (labeled "3" in FIG. 1), the suspension feeding system 26" injects the suspension 14 into an atomizer 32, which atomizes or nebulizes the suspension 14 into droplets that are introduced into the plasma jet 28. It is to be understood that the plasma spray system 22 does not utilize a carrier gas to introduce the precursors 16, 18, but rather uses the carrier liquid 20 of the suspension 14, to deliver the precursors 16, 18 to the plasma jet 28.

In the plasma jet 28, the suspension 14, in the form of the liquid-based stream or the droplets, is fragmented due, at least in part, to the flow and shear forces. The carrier liquid 20 in the suspension 14 is vaporized and evaporated. The evaporation of the carrier liquid 20 provides a cooling effect for the plasma jet 28 at its edges and extending outward into the environment surrounding the plasma jet 28. The cooled areas allow at least some of the precursor particles 16, 18 (those having their trajectory along these areas) within the plasma jet 28 to retain their spherical or unmelted shapes upon being deposited. In spite of the cooling effect, it is believed that the plasma jet 28 still includes hot zones, and particles 16, 18 having a trajectory along these zones of the plasma jet 28 will melt or soften and form splats (i.e., aggregates that are flatter compared to the spherical shape) upon being deposited. In one example, the particles 16, 18 deposited to form the splats are at least partially melted. In another example, the particles 16, 18 deposited to form the splats are fully melted. In still another example, the particles 16, 18 deposited to form the splats are a mixture of partially melted and fully melted particles 16, 18. The melting state of the particles 16, 18 may be controlled by controlling a temperature of the plasma spraying and by controlling a feed rate of the suspension 14.

The cooling effect from the carrier liquid 20 provides enough cooling that additional cooling processes or mechanisms are not utilized in the method disclosed herein.

The plasma jet 28 accelerates the precursor particles 16, 18 toward a substrate 30, which may be a current collector (that remains in contact with the final electrode 12) or any other base material. In some examples, a removable support may be used that can be peeled away from the electrode 12 so that a free-standing electrode 12 is formed. The removable support may also remain in contact with the electrode 12 if that is desirable.

The previously mentioned cooling effect is also believed to enhance the bond strength, and thus the adhesion, between the electrode 12 that is formed and the underlying substrate 30. In an example, pull strengths ranging from 8,000 psi to 10,000 psi (per ASTM C633 tests) may be achieved.

The plasma spraying of the suspension 14 may be continued for a suitable time to generate the electrode 12 having a desirable thickness. The amount of time that the plasma spraying of the suspension 14 is carried out for may vary depending on the line speed and feed rate. Generally, a higher line speed results in a faster plasma spraying of the suspension 14. For example, the line speed may be 1000 mm/s and the feed rate may range from about 200 mL/s to about 500 mL/s. In an example, the thickness ranges from about 0.1 μm to about 100 μm, or more (e.g., up to about 200 μm). In another example, the thickness ranges from 1 μm to about 20 μm. The thickness that may be achieved per pass of the plasma spray depends, at least in part, on the process/spray parameters. As such, multiple spraying passes may be required in order to achieve a desired thickness.

The distance 34 between the end of the plasma source 24 and the substrate 30 may range from about 1 cm to about 50 cm. In some examples, a desired range is from about 5 cm to about 10 cm. This relatively short distance may be utilized because of the cooling effect introduced by the carrier liquid 20 and because the inertia of the particles 16, 18 is low (due in part to relatively stable plasma conditions, such as temperature and velocity).

The method disclosed herein provides a stable, pulse-free suspension stream in order to produce a reproducible, high quality electrode 12. The electrode 12 morphology and properties may be affected by the nature of the suspension 14, the mode by which the suspension 14 is injected, and the spraying parameters. By varying one or more of these factors, the density and/or porosity of the electrode 12 may be controlled. As an example, if larger particles are used in the suspension 14, a denser coating with large pores would be formed. A suitably dense coating may be obtained by selecting a particle size that is not too large but not too small (i.e., medium sized particles in accordance with the particle size range provided herein). In any of the examples disclosed herein, the resulting electrode 12 is believed to be free of defects (e.g., cracks, etc.)

Figure 2:
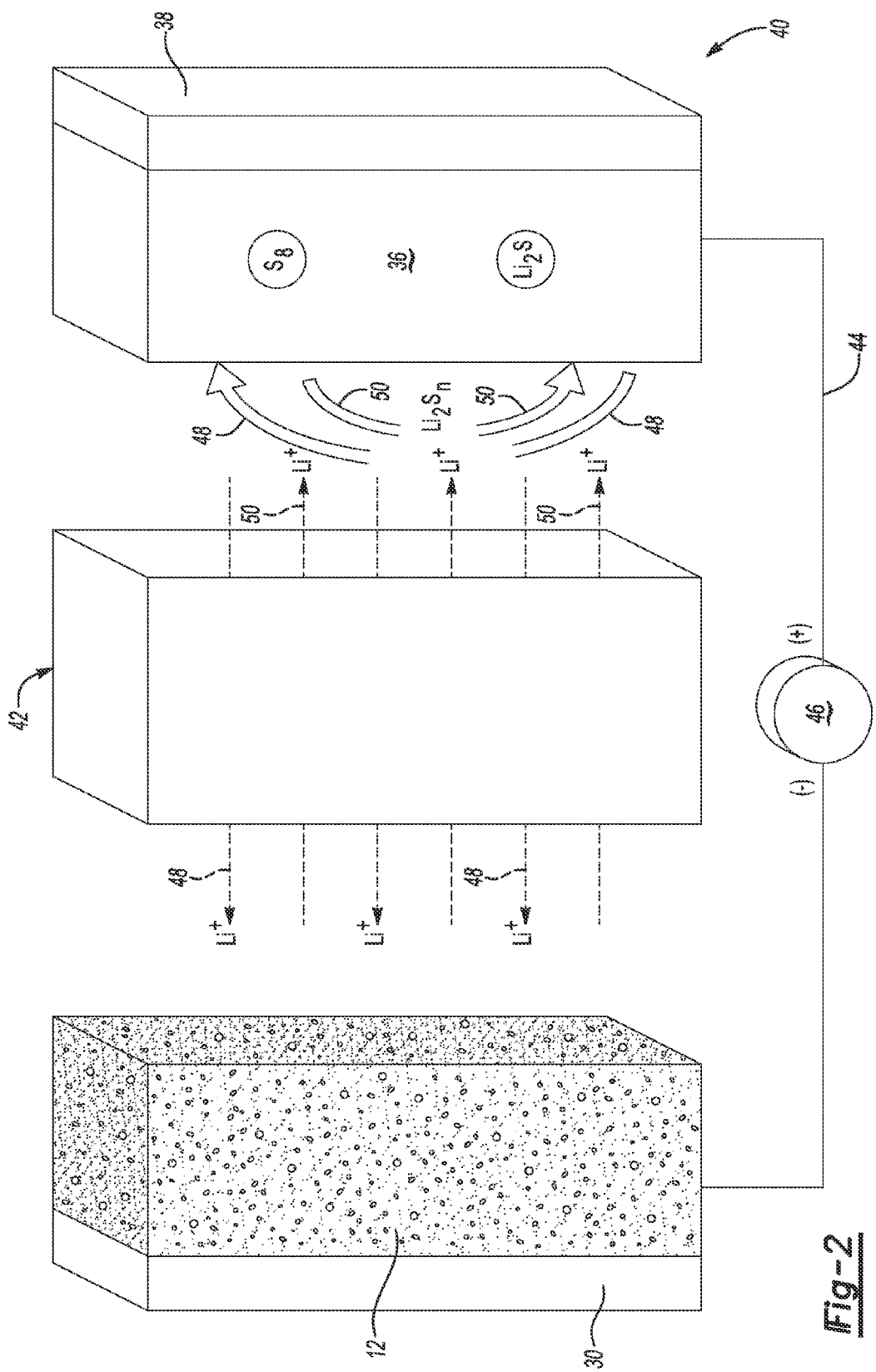
FIG. 2 is a schematic, perspective view of an example of a lithium-sulfur battery showing a charging and discharging state, the battery including an example of a pre-lithiated silicon anode according to the present disclosure.

The lithiated silicon electrode 12 that is formed may be used as the negative electrode or anode of a lithium-sulfur battery. An example of the lithium-sulfur battery 40 including the electrode 12 as the anode is schematically shown in FIG. 2. The battery 40 generally includes the anode 12, a cathode 36, and a porous polymer separator 42. The lithium-sulfur battery 40 also includes an interruptible external circuit 44 that connects the anode 12 and the cathode 36. Each of the anode 12, the cathode 36, and the porous polymer separator 42 are soaked in an electrolyte solution that is capable of conducting lithium ions.

The porous polymer separator 42, which operates as both an electrical insulator and a mechanical support, is sandwiched between the anode 12 and the cathode 36 to prevent physical contact between the two electrodes 12, 36 and the occurrence of a short circuit. While not shown, it is to be understood that barrier layer(s) may be formed between the porous polymer separator 42 and the cathode 36 in order to prevent the passage of polysulfide ions across the porous polymer separator 42. The porous polymer separator 42, in addition to providing a physical barrier between the two electrodes 12, 36, ensures passage of lithium ions (identified by the Li$^+$) and some related anions through the electrolyte solution filling its pores.

The porous polymer separator 42 may be formed of a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer membranes include single layer polypropylene membranes, such as CELGARD 2400 and CELGARD 2500 from Celgard, LLC (Charlotte, N.C.). It is to be understood that the membrane may be uncoated or untreated. For example, the membrane may not include any surfactant treatment thereon. In other examples, the membrane may be treated with a surfactant.

The porous polymer separator 42 may also be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the separator 42 is poly(p-hydroxybenzoic acid). In yet another example, the porous polymer separator 42 may be chosen from a combination of the polyolefin (such as PE and/or PP) and one or more of the polymers for the membrane 16 listed above.

The porous polymer separator 42 may be a single layer or may be a multi-layer (e.g., bilayer, trilayer, etc.) laminate fabricated from either a dry or wet process. For example, a single layer of the polyolefin and/or other listed polymer may constitute the entirety of the porous polymer separator 42. As another example, however, multiple discrete layers of similar or dissimilar polyolefins and/or polymers may be assembled into the porous polymer separator 42. In one example, a discrete layer of one or more of the polymers may be coated on a discrete layer of the polyolefin to form the porous polymer separator 42. In some instances, the separator 42 may include fibrous layer(s) to impart appropriate structural and porosity characteristics.

As mentioned above, the anode 12 is the lithiated silicon electrode formed by the suspension plasma spraying process disclosed herein. In the example shown in FIG. 2, the anode 12 is formed on the substrate 30, which is a negative-side current collector. The negative-side current collector 30 may be formed from copper or any other appropriate electrically conductive material known to skilled artisans. The negative-side current collector 30 collects and moves free electrons to and from the external circuit 44.

The cathode 36 of the lithium-sulfur battery 40 may be formed from any sulfur-based active material that can sufficiently undergo alloying and dealloying with aluminum or another suitable current collector 38 functioning as the positive terminal of the lithium-sulfur battery 40. Examples of sulfur-based active materials include $S_8$, $Li_2S_8$, $Li_2S_6$, $Li_2S_4$, $Li_2S_2$, and $Li_2S$. Another example of the sulfur-based active material may be a sulfur-carbon composite. The cathode 36 may be encapsulated with carbon and may also include a polymer binder material to structurally hold the sulfur-based active material together. The polymeric binder may be made of at least one of polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyvinyl alcohol (PVA), polyimide, poly(acrylamide-co-diallyl dimethyl ammonium chloride), sodium alginate, or other water-soluble or organic solvent-based binders.

A positive-side current collector 38 may be formed from aluminum or any other appropriate electrically conductive material known to skilled artisans. The positive-side current collector 38 collects and moves free electrons to and from the external circuit 44.

Any appropriate electrolyte solution (not shown) that can conduct lithium ions between the anode 12 and the cathode 36 may be used in the lithium-sulfur battery 40. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in ether to form the non-aqueous liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LiFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The lithium-sulfur battery 40 may support a load device 46 that can be operatively connected to the external circuit 44, which connects the anode 12 and cathode 36. The load device 46 receives a feed of electrical energy from the electric current passing through the external circuit 44 when the lithium-sulfur battery 40 is discharging. As such, the load device 46 may be powered fully or partially by the electric current passing through the external circuit 44 when the lithium-sulfur battery 40 is discharging. While the load device 46 may be any number of known electrically-powered devices, a few specific examples of a power-consuming load device include an electric motor for a hybrid vehicle or an all-electrical vehicle, a laptop computer, a cellular phone, and a cordless power tool. The load device 46 may also, however, be a power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the anode 12 and the cathode 36 for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 46 so requires.

The lithium-sulfur battery 40 can generate a useful electric current during battery discharge (shown by reference numeral 50 in FIG. 2). During discharge, the chemical processes in the battery 40 include lithium ($Li^+$) dissolution from the surface of the anode 12 and incorporation of the lithium cations into alkali metal polysulfide salts (i.e., $Li_2S$). As such, polysulfides are formed (sulfur is reduced) on the surface of the cathode 36 in sequence while the battery 40 is discharging. The chemical potential difference between the cathode 36 and the anode 12 (ranging from approximately 1.5 to 3.0 volts, depending on the exact chemical make-up of the electrodes 12, 36) drives electrons produced by the dissolution of lithium at the anode 12 through the external circuit 44 towards the cathode 36. The resulting electric current passing through the external circuit 44 can be harnessed and directed through the load device 46 until the lithium in the anode 12 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 48 in FIG. 2), lithium plating to the anode 12 takes place and sulfur formation at the cathode 36 takes place. The connection of an external power source to the lithium-sulfur battery 40 compels the otherwise non-spontaneous oxidation of lithium at the cathode 36 to produce electrons and lithium ions. The electrons, which flow back towards the anode 12 through the external circuit 44, and the lithium ions (Li⁺), which are carried by the electrolyte across the porous polymer separator 42 back towards the anode 12, reunite at the anode 12 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

It is to be understood that the ranges provided herein include the stated range and any value or sub-range within the stated range. For example, a range of about 1 nm to about 100 nm should be interpreted to include not only the explicitly recited limits of about 1 nm to about 100 nm, but also to include individual values, such as 25 nm, 42 nm, 90.5 nm, etc., and sub-ranges, such as from about 5 nm to about 75 nm; from about 20 nm to about 55 nm, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A one-step method for preparing a lithiated silicon electrode, the one step method comprising:
   plasma spraying, without a carrier gas, a suspension of a lithium precursor particle and a silicon precursor particle in a carrier liquid of water, alcohol, ethylene glycol, or mixtures thereof, the lithium precursor particle being selected from the group consisting of a lithium phosphate, a lithium nitrate, a lithium sulfate, a lithium carbonate, and combinations thereof, the silicon precursor particle and the suspension excluding an active carbon material and a binder.

2. The one-step method as defined in claim 1 wherein the suspension further includes a metal organic precursor in isopropanol.

3. The one-step method as defined in claim 1 wherein the suspension further includes a polymeric complex.

4. The one-step method as defined in claim 1 wherein the suspension is introduced as a liquid stream into plasma jet used in the plasma spraying.

5. The one-step method as defined in claim 1 wherein the suspension is nebulized into droplets and then introduced into plasma jet used in the plasma spraying.

6. The one-step method as defined in claim 1 wherein the suspension further includes a dispersant.

7. The one-step method as defined in claim 1 wherein the suspension is plasma sprayed on a target substrate, and wherein a spray distance between a plasma torch and the target substrate ranges from about 1 cm to about 50 cm.

8. The one-step method as defined in claim 1 wherein the plasma spraying is performed at a temperature less than or equal to 150° C.

9. The one-step method as defined in claim 1, further comprising adjusting a parameter of the plasma spraying to control a porosity of the lithiated silicon electrode.

10. The one-step method as defined in claim 1, further comprising controlling a temperature of the plasma spraying to control a melting state of the lithium precursor and the silicon precursor.

11. The one-step method as defined in claim 10 wherein the lithium precursor and the silicon precursor form splats on a substrate upon which they are deposited, the splats being at least partially melted.

12. The one-step method as defined in claim 1 wherein the carrier liquid in the suspension causes a cooling effect during plasma spraying, thereby increasing a bond strength between a substrate and splats formed from the lithium precursor and the silicon precursor deposited on the substrate.

13. The one-step method as defined in claim 12 wherein the carrier liquid is water and no external cooling mechanism is used in the one-step method.

14. The one-step method as defined in claim 1, further comprising adjusting a parameter of the plasma spraying to control a thickness of the lithiated silicon electrode such that the thickness ranges from about 0.1 µm to about 250 µm.

15. A one-step method for preparing a lithiated silicon electrode, the one step method comprising:
   plasma spraying, without a carrier gas, a suspension of a lithium precursor nanopowder particle having an average diameter of less than or equal to about 100 nm and a silicon precursor nanopowder particle having an average diameter of less than or equal to about 100 nm in a carrier liquid of water, alcohol, ethylene glycol, or mixtures thereof, the lithium precursor being selected from the group consisting of a lithium phosphate, a lithium nitrate, a lithium sulfate, a lithium carbonate, and combinations thereof, the silicon precursor particle and the suspension excluding an active carbon material and a binder.

16. The one-step method as defined in claim 15 wherein the plasma spraying is performed at a temperature less than or equal to 150° C.

17. The one-step method as defined in claim 15 wherein the carrier liquid in the suspension causes a cooling effect during plasma spraying, thereby increasing a bond strength between a substrate and splats formed from the lithium precursor and the silicon precursor deposited on the substrate.

18. The one-step method as defined in claim 17, wherein the bond strength has a pull strength ranging from 8,000 pound per square inch (psi) to 10,000 psi.

19. The one-step method as defined in claim 15 wherein the carrier liquid is water and no external cooling mechanism is used in the one-step method.

20. The one-step method as defined in claim 15, further comprising adjusting a parameter of the plasma spraying to control a thickness of the lithiated silicon electrode such that the thickness ranges from about 0.1 µm to about 250 µm.

* * * * *